United States Patent [19]
Juszak et al.

[11] Patent Number: 5,279,875
[45] Date of Patent: Jan. 18, 1994

[54] LABEL-EQUIPPED BUSINESS FORM AND METHOD

[75] Inventors: Joseph J. Juszak, Crystal Lake; Ronald Garrison, Batavia; Peter Walter, Schaumburg, all of Ill.

[73] Assignee: Wallace Computer Services, Inc., Hillside, Ill.

[21] Appl. No.: 6,820

[22] Filed: Jan. 21, 1993

[51] Int. Cl.⁵ .............. B32B 31/12; B32B 31/10; B31F 1/00; G09F 3/04
[52] U.S. Cl. .............................. 428/42; 428/40; 428/41; 428/43; 283/81; 281/2; 281/5
[58] Field of Search ............... 428/40, 41, 42, 43; 283/81; 281/2, 5

[56] References Cited

U.S. PATENT DOCUMENTS

| | | | |
|---|---|---|---|
| 4,379,573 | 4/1983 | Lomeli et al. | 428/42 |
| 4,425,386 | 1/1984 | Chang | 427/256 |
| 4,833,122 | 5/1989 | Doll et al. | 428/913 X |
| 4,925,213 | 5/1990 | Anderson | 428/43 X |
| 4,938,507 | 7/1990 | Ashby et al. | 282/9 R |
| 5,011,559 | 4/1991 | Felix | 156/257 |
| 5,076,489 | 12/1991 | Steidinger | 229/71 |
| 5,088,961 | 2/1992 | Sprain | 462/2 |
| 5,209,698 | 5/1993 | Dolan | 281/2 X |

Primary Examiner—Daniel Zirker
Attorney, Agent, or Firm—Tilton, Fallon, Lungmus & Chestnut

[57] ABSTRACT

A label-equipped form having a release liner on the back of which is provided CB chemical and with CF chemical being provided in alignment on the top of the next adjacent ply.

4 Claims, 1 Drawing Sheet

LABEL-EQUIPPED BUSINESS FORM AND METHOD

BACKGROUND AND SUMMARY OF INVENTION

This invention relates to a label-equipped business form and method and, more particularly, to a form employing carbonless chemical pairs.

The invention provides a label die-cut from label stock and equipped with a pressure sensitive adhesive-equipped release liner on the back of the label stock. Such a form is known in the art as seen in U.S. Pat. Nos. 4,379,573 and 5,011,559.

Prior to the instant invention, if the label was on the first ply of the form, no image could be transferred to the ply directly below it in the area covered by the liner—unless a carbon paper ply is inserted between the two plies so as to produce an image. Such ply insertion complicates the production and handling of forms.

Alternatively the ply below the first ply could be made of self-contained carbonless paper which would produce an image but such self-contained paper is expensive and such paper is always sensitive to smudging since it is always "live" to the touch. Such self contained paper is disclosed in conjunction with a multi-sheet assembly in co-owned U.S. Pat. No. 4,425,386.

If the label were put on one of the lower plies or the last ply, the images would be transferred to all plies but the image on the label would be carbonless—not an original. And the image would be weak and could fade with time. Also, it is inconvenient to pull a label off a lower ply rather than the top ply.

According to the invention, the first ply has all or part of the back surface coated with a carbonless chemical CB coating. The form also has a second ply of paper that has at least a portion thereof coated with a carbonless CF chemical. Further, any number of any intermediate plies of paper with CF coatings on the faces thereof and CB coatings on the back surfaces thereof can be employed. The adjacent coatings match in order to give carbonless images when the form is imprinted through an impact printer.

More particularly, the first ply has a silicone-coated patch of release liner paper that is adhered to its back surface through the use of pressure-sensitive coating on the silicone coated side. This liner paper has a coating of CB carbonless chemical on its back surface and a similar patch could be adhered to one or more intermediate plies in a similar manner. The paper ply or plies that have the liner stock adhered to the back are die-cut through the front within the periphery of the adhesive coated area to form a removable label.

Since the back of the liner is coated with CB chemical, any impact on the label made by an impact printer creates an image in the CF coating in the ply below the ply with the label. The CB chemical on the label mates and reacts with the CF chemical on the lower ply.

If the information that is printed on the label must remain on the top paper ply after the label is removed, the liner can be used with a self contained carbonless coating below the silicone coating. Such liner stock is readily available commercially. The same information that is in the label can also be on the liner and would show when the label is removed.

Exemplary of multi-ply forms making use of CB/CF coatings is a mailer seen in co-owned U.S. Pat. No. 5,076,489.

BRIEF DESCRIPTION OF DRAWINGS

The invention is described in conjunction with the accompanying drawing, in which.

DETAILED DESCRIPTION

Figure 1:
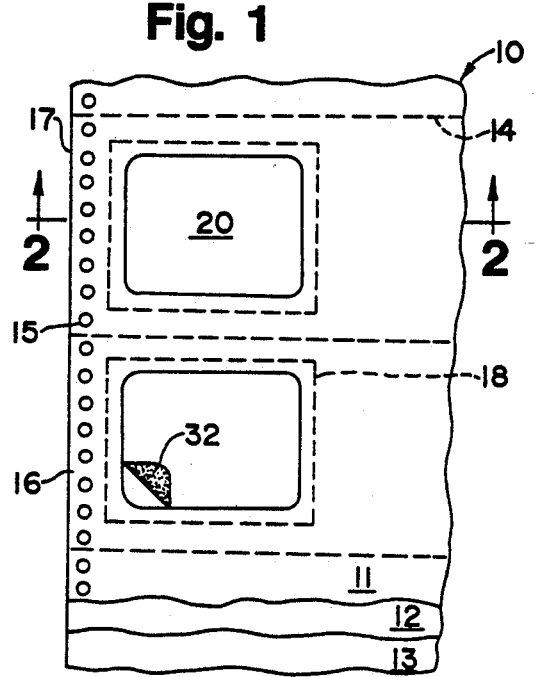
FIG. 1 is a fragmentary top plan view of a business form string prepared according to the teachings of this invention.

Referring to FIG. 1, the numeral 10 designates generally a string of interconnected business form lengths of the general type seen in co-owned U.S. Pat. No. 5,076,489. One form ply is designated 11 with the adjacent underlying form ply being designated 12 and the third form ply 13.

Usually the form lengths are produced continuously on a collator and conveniently converted to zig-zag folded packs for shipment. Prior to collation, the forms are usually printed. Also, lines of transverse perforation 14 are provided either at the press or at the collator to define the ends of each form length. The entire string is equipped with line holes 15 defining a control punched margin 16 along at least one longitudinally extending side 17—see the left side of FIG. 1. Normally, however, line holes and therefore control punched margins, are provided along both longitudinal sides for better control of the web during both manufacture and subsequent processing through the computer printer—as seen in the '489 patent. However, for simplicity of presentation, the other control punch margin has been omitted from FIG. 1 and when the base stock is just a sheet, both margins are usually omitted, as would be the case with snap out forms.

Still referring to FIG. 1, the form lengths are each equipped with a novel patch 18 which combines the function of a release liner, adhesive carrier and—in the instant invention—the carrier of the CB coating for transfer to underlying plies in alignment with the label 20 defined by die cut 19. For example, in FIG. 2, the liner patch is generally designated 18 and is seen to be made up of a liner sheet 21 sandwiched between an upper coating 22 of silicone and a lower coating 23 of carbonless CB material. Similarly, the coatings are shown in the middle part of FIG. 3 and partially broken away to reveal the liner sheet 21.

Referring again to FIG. 2, the upper ply 11 is seen to include a paper portion 24 which is coated on its under surface with a CB coating as at 25. Thus, any impression on the paper ply 24 will be reproduced on the intermediate ply 12 by virtue of the paper ply 26 being coated with a CF coating 27 on its upper surface. The lower surface of the ply 12 again is equipped with a CB coating as at 28.

Lastly, the third or bottom ply 13 has a paper ply 29 coated on its upper surface with a CF coating 30 so as to coact with the CB coating 28.

Figure 3:
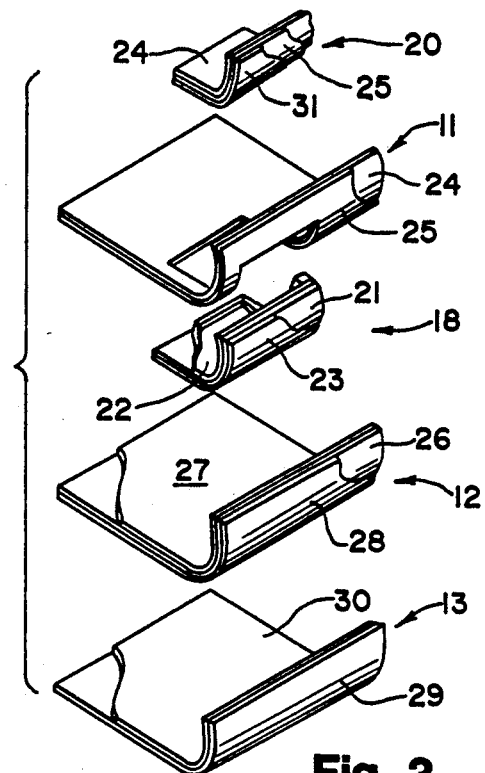
FIG. 3 is an exploded perspective view of the plies shown in FIG. 2.
Figure 2:
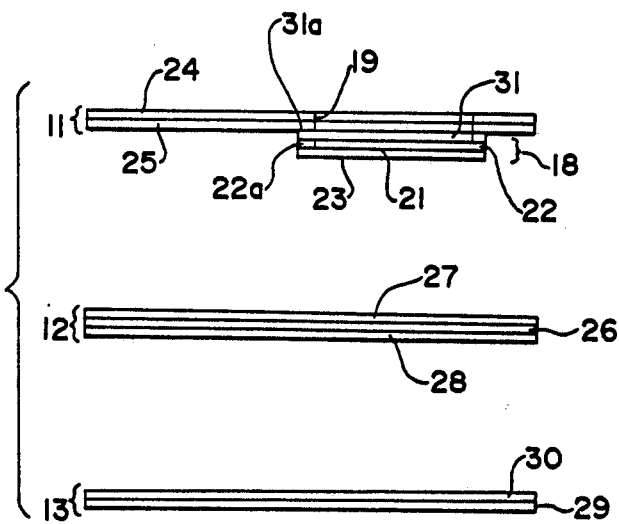
FIG. 2 is an exploded sectional view such as would be seen along the sight line 2—2 applied to FIG. 1.

Provided on the underside of the ply 11—more specifically on the underside of the CB coating 25 is a coating of pressure sensitive adhesive 31. Thus, after the usual impact printing has occurred, the label 20 can be stripped away as indicated at 32 in FIG. 1 and normally carries with it most if not all of the pressure sensitive adhesive 31 underlying the label 20—see FIG. 1 in the lower left hand portion thereof. In some instances there may be a small border 31a of adhesive left on the patch 18 as seen in FIGS. 2 and 3—particularly if the silicone coating 22 terminates short of the edges of the ply 21—as at 22a in FIG. 2. This insures that the ply 21 remains attached to the web 24.

Figure 4:
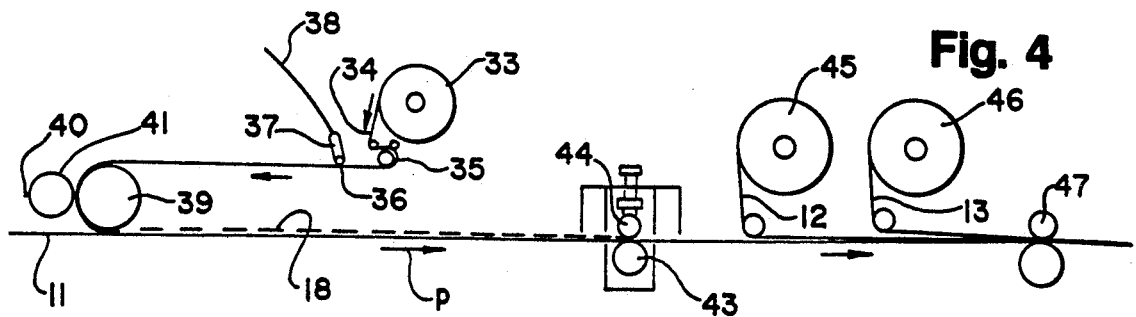
FIG. 4 is a schematic side elevational view of apparatus employed in the practice of the method of this invention.

It is believed that the invention can be further understood by describing the method of producing the label equipped form and this is set forth following in connection with FIG. 4.

THE INVENTIVE METHOD

Referring now to FIG. 4, the web 11 (consisting of a CB coated sheet) is seen to be proceeding along a longitudinally extending path designated by an arrow P. The path normally is provided by side frames (not shown) and which carry the various processing rolls. Provided adjacent the path P is a roll 33 of web material having one surface coated with silicone 22 or other release material and the other surface with a CB coating 23. This web material may be a bond paper and advantageously has a slightly higher moisture content than normal paper, viz., 5% as contrasted to the normally employed 2% for release liner patches. Such web material is commercially available under product designation SBL 2.1 SC SILOX B3H/O from AKROSIL located in Menasha, Wisconsin.

The continuous coated web 34 (consisting of ply 21 and coatings 22 and 23) is unwound from the roll 33 by means of an infeed draw rolls. Thereafter, the web 34 proceeds past a nozzle 36 for applying pressure sensitive adhesive to the upper face thereof. The nozzle 36 may be advantageously equipped with a solenoid controlled valve 37 to intermittently interrupt flow of material in supply line 38 to the nozzle 36 so as to develop transverse areas free of release material. Longitudinally extending adhesive-free areas can be achieved by employing a nozzle having a discharge orifice narrower than the width of the web 34.

At this point in time, the web 11 which consists of a label stock ply 24 has CB coating 25 on its upper surface. The patch 18 combines the function of a release liner, an adhesive carrier and a carrier for CB coating. The CB coating 23 insures that whatever is imprinted on the label 20 also is reproduced on the underlying plies—ply 26, for example, through the provision of CF coating 27.

Imprinting of the web 24 outside the ara of label 20 is reproduced, if desired, on ply 26 by virtue of the CB coating 25 on ply 24.

Continuing the description of FIG. 4, downstream of the point at which the patches or plies of liner material 18 are applied to the web 11, the web is subjected to a die cutting operation as at 42. This is brought about by the operation of a knife roll 43 bearing against an anvil roll 44 so as to cut the closed perimeter 19 only in the web 11 and not in the liner patch 18. It will be appreciated that the closed perimeter die cut 19 is within the confines of the release liner 18—see FIG. 1. More particularly, the die cut 19 is normally within the portion of the patch 18 covered by adhesive.

Thereafter the web 11 is augmented by the web 12 which has the paper web 26 advantageously equipped beforehand with the coatings 27 and 28 and provided in roll form as at 45. Further, the ply 13 also previously equipped with the CF coating 30 can be provided in roll form as at 46 and then added to the now-combined plies 12, 11. Thereafter the cross perforations 14 are added at 47. Omitted for ease of showing are means for integrating the various plies together which may take the form of glue lines, dimpling, etc.

Usually, the form lengths are produced continuously and conveniently converted to zig-zag folded packs for shipment. Lines of transverse perforation 14 define the ends of each form length. The entire string is equipped with line holes 15 defining a control punch margin 16 along at least one longitudinally extending side 17.

Normally, however, line holes and therefore control punch margins, are provided along both longitudinal sides for better control of the web during both manufacture and subsequent processing through the computer printer—as seen in the '489 patent. However, for simplicity of presentation, the other control punch margin has been omitted from FIG. 1 and when the base stock web is just a sheet, both margins are usually omitted, as would be the case with snap-out forms.

While in the foregoing specification a detaileddescription of the invention has been set down for the purpose of illustration, many variations in the details hereingiven may be made by those skilled in the art without departing from the spirit and scope of the invention.

We claim:

1. A multi-ply business form comprising at least a first ply and a second ply, said first ply having a closed perimeter die-cut therein defining a removable label having a perimeter smaller than the perimeter of said first ply, each of said plies having top and bottom faces, the bottom face of said first ply being coated with pressure sensitive adhesive at least in the area of said label,
    a release liner covering said adhesive and having a perimeter larger than the perimeter of said label whereby said liner remains with said first ply when said label is removed therefrom, said release liner having top and bottom faces with said release liner top face contacting said adhesive, said release liner bottom face being coated with a carbonless CB coating,
    said second ply having top and bottom faces with said second ply top face being positioned adjacent said release liner, said second ply top face being coated with a CF coating in the area of said release liner CB coating whereby at least the impressions on said label are reproduced on said second ply.

2. The business form of claim 1 in which said form further comprises a third ply with said second ply being an intermediate ply between said first and third plies.

3. The form of claim 2 in which at least one of said second and third plies also has a die-cut label pressure sensitive adhesive, release liner and CB coating.

4. The form of claim 1 in which said first ply has a carbonless CB coating extending substantially over the bottom face thereof and said second ply has a carbonless CF coating extending substantially over the top face thereof.

* * * * *